(12) United States Patent
Weitzel et al.

(10) Patent No.: US 9,145,209 B2
(45) Date of Patent: Sep. 29, 2015

(54) ROTATABLE CABIN ATTENDANT SEAT AND AIRCRAFT MONUMENT ARRANGEMENT WITH A ROTATABLE CABIN ATTENDANT SEAT

(71) Applicant: Airbus Operations GmbH, Hamburg (DE)

(72) Inventors: Sebastian Weitzel, Hamburg (DE); Enrico Urban, Hamburg (DE)

(73) Assignee: AIRBUS OPERATIONS SAS, Toulouse (FR)

( * ) Notice: Subject to any disclaimer, the term of this patent is extended or adjusted under 35 U.S.C. 154(b) by 288 days.

(21) Appl. No.: 13/655,076

(22) Filed: Oct. 18, 2012

(65) Prior Publication Data

US 2013/0126672 A1 May 23, 2013

Related U.S. Application Data

(60) Provisional application No. 61/549,285, filed on Oct. 20, 2011.

(30) Foreign Application Priority Data

Oct. 20, 2011 (DE) .......................... 10 2011 116 521

(51) Int. Cl.
*B64D 11/06* (2006.01)
(52) U.S. Cl.
CPC ............ *B64D 11/06* (2013.01); *B64D 11/0691* (2014.12); *B64D 11/0698* (2014.12)
(58) Field of Classification Search
CPC ............... B64D 11/06; B64D 11/0689; B64D 11/0691; B64D 11/0698
USPC ................................ 244/118.5, 118.6, 122 R
See application file for complete search history.

(56) References Cited

U.S. PATENT DOCUMENTS

| | | | | |
|---|---|---|---|---|
| 2,523,960 | A | * | 9/1950 | Liljengren et al. ............... 297/43 |
| 3,131,964 | A | * | 5/1964 | Reed ................................ 297/13 |
| 3,594,037 | A | * | 7/1971 | Sherman .......................... 297/14 |
| 4,460,215 | A | * | 7/1984 | Chamberlain et al. .......... 297/14 |
| 4,536,027 | A | * | 8/1985 | Brennan ........................ 297/124 |
| 4,679,749 | A | * | 7/1987 | Ryan et al. ................. 244/122 R |
| 4,740,030 | A | * | 4/1988 | Nordskog ........................ 297/13 |
| 4,799,632 | A | * | 1/1989 | Baymak et al. ............ 244/122 R |
| 4,993,666 | A | * | 2/1991 | Baymak et al. ............ 244/122 R |

(Continued)

FOREIGN PATENT DOCUMENTS

| | | |
|---|---|---|
| DE | 36 29 505 | 3/1988 |
| DE | 37 90 556 | 10/1996 |

(Continued)

*Primary Examiner* — Tien Dinh
*Assistant Examiner* — Steven Hawk
(74) *Attorney, Agent, or Firm* — Dickinson Wright PLLC (57) ABSTRACT

A cabin attendant seat (14) comprises a backrest element (20) and a seat element (22) which is secured to the backrest element (20). The backrest element (20) is rotatable about a rotation axis (24a, 24b) in order to move the cabin attendant seat (14) between a rest position and an operating position. A fastening device (18) for fastening the cabin attendant seat (14) to a side wall (16) of an aircraft monument (12) is constructed and sized in such a manner that it is capable of directing away a predetermined maximum force which can be introduced into the cabin attendant seat (14) during operation of the cabin attendant seat (14) via the side wall (16) of the aircraft monument (12).

14 Claims, 5 Drawing Sheets

(56) References Cited

U.S. PATENT DOCUMENTS

| | | | |
|---|---|---|---|
| 5,707,103 A * | 1/1998 | Balk | 297/13 |
| 6,231,103 B1 * | 5/2001 | Elson et al. | 296/65.06 |
| 6,460,922 B1 * | 10/2002 | Demick | 297/14 |
| 6,883,854 B2 * | 4/2005 | Daniel | 296/65.03 |
| 7,201,349 B2 * | 4/2007 | Lavie et al. | 244/118.5 |
| 7,490,906 B2 * | 2/2009 | Schumacher et al. | 297/353 |
| 8,109,554 B2 * | 2/2012 | Undevik | 296/65.04 |
| 8,770,659 B2 * | 7/2014 | Isherwood et al. | 297/14 |
| 2004/0195450 A1 * | 10/2004 | Hiesener | 244/118.5 |
| 2009/0206200 A1 * | 8/2009 | Bolder et al. | 244/118.5 |
| 2012/0199695 A1 * | 8/2012 | Isherwood et al. | 244/118.6 |
| 2013/0126671 A1 * | 5/2013 | Guering | 244/118.6 |
| 2013/0334369 A1 * | 12/2013 | Schliwa et al. | 244/118.5 |
| 2014/0027572 A1 * | 1/2014 | Ehlers et al. | 244/118.6 |
| 2014/0048650 A1 * | 2/2014 | Schliwa et al. | 244/118.5 |
| 2014/0166808 A1 * | 6/2014 | Boenning et al. | 244/118.6 |
| 2014/0209741 A1 * | 7/2014 | Boenning et al. | 244/118.6 |
| 2014/0224931 A1 * | 8/2014 | Weitzel et al. | 244/118.6 |

FOREIGN PATENT DOCUMENTS

| | | |
|---|---|---|
| DE | 10 2008 009 938 | 9/2009 |
| EP | 0 170 116 | 2/1986 |

* cited by examiner

ROTATABLE CABIN ATTENDANT SEAT AND AIRCRAFT MONUMENT ARRANGEMENT WITH A ROTATABLE CABIN ATTENDANT SEAT

The invention relates to a rotatable cabin attendant seat and an aircraft monument arrangement which comprises such a rotatable cabin attendant seat.

Cabin attendant seats which are provided in the passenger cabin of a modern commercial aircraft are used by the cabin personnel in particular during takeoff and landing of the aircraft. Such a conventional cabin attendant seat, as described, for example, in DE 10 2008 009 938A1, comprises a carrier element which is subdivided into a base element and a backrest element, and a seat element which is fastened to the carrier element and which is constructed as a folding seat element. When the cabin attendant seat is not in use, the seat element is located in a space-saving manner in a folded-up position, that is to say, a seat face of the seat element faces towards a front side of the backrest element of the carrier element. The cabin attendant seat is connected to the aircraft cabin floor by means of the base element of the carrier element.

Furthermore, there is known from DE 3 790 556C1a rotatable cabin attendant seat which comprises not only a seat element which is foldable relative to a carrier element, but also a rotatable backrest element. When these seats are not in use, the backrest element is in such a position that a seat element and a front side of the backrest element face away from the inner space of the passenger cabin. In an operating position of the cabin attendant seat, however, the seat element and the front side of the backrest element are accessible from the inner space of the passenger cabin so that a cabin attendant can be seated on the seat element.

An object of the invention is to provide a rotatable cabin attendant seat which is simple and uncomplicated to assemble, even in the event of layout changes to the aircraft cabin. Another object of the invention is to provide an aircraft monument arrangement which comprises such a rotatable cabin attendant seat.

This object is achieved by a rotatable cabin attendant seat having the features of claim 1 and an aircraft monument arrangement having the features of claim 14.

A cabin attendant seat comprises a backrest element and a seat element which is secured to the backrest element. The seat element may be constructed as a folding seat element. In the folded-up state of the seat element, a seat face of the seat element abuts a front side of the backrest element. In the folded-down state of the s seat element, however, the seat element or the seat face of the seat element extends substantially perpendicularly relative to the front side of the backrest element. If the seat element is located in the folded-down state thereof, a cabin attendant can sit on the cabin attendant seat, for example, during take-off and landing of the aircraft.

The cabin attendant seat is constructed as a rotatable cabin attendant seat, that is to say, the backrest element, together with the seat element, is rotatable about an axis of rotation which extends in a vertical direction when the cabin attendant seat is mounted in an aircraft cabin. By rotation of the backrest element about the rotation axis, the cabin attendant seat can be moved between a rest position and an operating position. When the cabin attendant seat is located in the rest position thereof, the front side of the backrest element faces away from the inner space of the aircraft cabin. However, a rear side of the backrest element faces towards the inner space of the aircraft cabin. When the cabin attendant seat is located in the operating position thereof, however, the front side of the backrest element is accessible from the inner space of the aircraft cabin so that the seat element can be folded down and the cabin attendant seat can be used. In a preferred embodiment of the cabin attendant seat, the backrest element is rotatable through an angle of approximately 90° about the axis of rotation.

Finally, the cabin attendant seat comprises a fastening device for fastening the cabin attendant seat to a side wall of the aircraft monument. The aircraft monument may be a galley, a toilet module, a partition wall or another aircraft monument which is installed in the aircraft cabin. The fastening device is configured and sized in such a manner that it is capable of directing away a predetermined maximum force which can be introduced into the cabin attendant seat during operation of the cabin attendant seat via the side wall of the aircraft monument. The maximum force which the fastening device must direct away via the side wall of the aircraft monument is predetermined by means of corresponding authorisation provisions. In particular, the maximum force is a calculated maximum force which acts on the cabin attendant seat in the event of an emergency. For example, it is possible to assume, as a predetermined maximum force, a force which acts on the cabin attendant seat when the cabin attendant seat is subjected to an acceleration of 9G or 16G, respectively.

Owing to the configuration of the cabin attendant seat with a fastening device which allows all forces acting on the cabin attendant seat during operation of the cabin attendant seat to be directed away via the side wall of the aircraft monument, it is possible to dispense with force-transmitting fixing of the cabin attendant seat to the aircraft cabin floor. When the cabin layout is changed, which is connected with a change of the position of the aircraft monument, it is advantageously possible to dispense with a corresponding adaptation of the structural connection of the cabin attendant seat to the aircraft cabin floor. Cabin layout changes are thereby simplified. Furthermore, it is even conceivable to already preassemble the aircraft monument or at least the side wall of the aircraft monument and the cabin attendant seat outside the aircraft to form an arrangement which can be handled independently. Assembly operations which are carried out in the aircraft cabin can thereby be reduced.

The fastening device may comprise a frame. The frame preferably has a first, a second, a third and a fourth frame element. Regardless of whether the cabin attendant seat is in the operating position or in the rest position thereof, the first frame element is preferably orientated substantially parallel with an upper side of a headrest of the cabin attendant seat. The first frame element preferably extends over a part-portion of the upper side of the headrest. However, the second frame element is preferably orientated substantially parallel with a rear side of the backrest element of the cabin attendant seat when the cabin attendant seat is located in the operating position thereof. However, a rotation of the backrest element about the axis of rotation through approximately 90° into the rest position of the cabin attendant seat results in the second frame element being orientated substantially parallel with a first side face of the backrest element.

The third frame element preferably extends substantially parallel with the first frame element and, when the cabin attendant seat is located in its operating position, is preferably orientated substantially parallel with a lower side of the seat element of the cabin attendant seat. The fourth frame element, when the cabin attendant seat is in the operating position, is preferably orientated substantially parallel with the first side face of the backrest element of the cabin attendant seat. If the cabin attendant seat is located in its rest position, the fourth frame element preferably extends substantially parallel with the front side of the backrest element.

The third frame element is preferably formed by a portion of an upper boundary wall of a storage compartment which, when the cabin attendant seat is mounted in an aircraft cabin, is arranged below the cabin attendant seat. The storage compartment may be used, for example, to receive items of emergency equipment. The storage compartment is preferably sized in such a manner that it terminates substantially in alignment with the rear side of the backrest element of the cabin attendant seat when the cabin attendant seat is in the rest position thereof.

A first portion of the fourth frame element is preferably constructed in an integral manner with the first frame element. A second portion of the fourth frame element that is not constructed integrally with the first frame element is preferably received in a groove, which is delimited by a surface of the first frame element facing the fourth frame element and a part-region of the first portion of the fourth frame element that is integrally constructed with the first frame element Such a configuration enables optimised introduction of force into the side wall of the aircraft monument.

At least one bore for receiving a fastening element for fastening the frame to the side wall of the aircraft monument is preferably constructed in the fourth frame element. A screw, a rivet or the like may be used as a fastening element. The fourth frame element preferably has a plurality of bores, wherein the number of bores or the number of fastening elements which are intended to be received in the bores may be adjusted to the maximum force which the fastening device is intended to direct away via the side wall of the aircraft monument.

The backrest element may comprise a receiving device which is provided with an inner thread, A portion of the rotation axis that is provided with an outer thread may be screwed in the receiving device in order to connect the rotation axis to the backrest element. The receiving device may be provided, for example, in a frame of the backrest element. If desired, the receiving device may comprise a recess, which serves to receive a counter-nut. Owing to the counter-nut, the rotation axis may be connected to the backrest element in a rotationally secure manner.

The fastening device may comprise a first connection device for rotatably connecting the rotation axis to the frame and/or a second connection device for rotatably connecting the rotation axis to the frame. The first connection device may be used to rotatably connect the rotation axis to the first frame element. However, the second connection device may be provided to rotatably connect the rotation axis to the third frame element. With such a configuration of the fastening device, forces acting on the cabin attendant seat are introduced into the frame via the rotation axis and the first or second connection device. A fastening device having a first and a second connection device is also suitable for co-operation with a rotation axis which is constructed in two pieces.

The first connection device may comprise a bore which is constructed in particular in the first frame element for receiving the rotation axis. In a similar manner, the second connection device may comprise a bore which is constructed in particular in the third frame element for receiving the rotation axis. These bore(s) may be provided with a radial flange which protrudes inwards.

A first surface of the flange may then form an abutment face for a head of a rotation axis that is constructed in the form of a pin. Owing to the co-operation of the first flange surface with the head of the rotation axis which is constructed in the form of a pin, the position of the rotation axis which is constructed in the form of a pin is fixed relative to the frame. A second surface of the flange opposite the first surface may, however, form an abutment face for a bearing which is at least partially received in the bore. The bearing may, for example, be constructed in the form of a ball bearing.

A resilient ring may be used to secure the bearing in its position in the bore. The resilient ring may be supported in particular in a groove which is formed in a wall of the bore. Such an arrangement can be readily assembled, enables good transmission of force and consequently ensures reliable retention of the cabin attendant seat.

In a particularly preferred embodiment of the cabin attendant seat, the rotation axis which, as already mentioned, may be constructed in one piece or in two pieces, is connected to the backrest element with spacing from the first side face of the backrest element in the region of a front side of the backrest element. Such a configuration enables a particularly space-saving arrangement of the cabin attendant seat since it is thereby no longer necessary, at the side wall of the aircraft monument to which the cabin attendant seat is fastened, to keep free a face which corresponds to the first side face of the backrest element in order to enable unimpeded rotation of the cabin attendant seat from its rest position into its operating position.

The feature of the cabin attendant seat that the rotation axis is connected to the backrest element with spacing from the first side face of the backrest element in the region of a front side of the backrest element can also be claimed independently of the feature of the cabin attendant seat that a fastening device is constructed and sized in such a manner that it is capable of directing away a predetermined maximum force which is introduced into the cabin attendant seat during operation of the cabin attendant seat via the side wall of the aircraft monument. Furthermore, any combination of the features of the cabin attendant seat described above and below is possible.

An edge of the cabin attendant seat formed by the first side face and a rear side of the backrest element is preferably constructed in a rounded manner. In particular in combination with the above-described frame, unimpeded rotation of the backrest element about the rotation axis is thereby possible, that is to say, the rounded edge prevents the backrest element from striking the frame, in particular the second frame element, during rotation about the rotation axis.

The cabin attendant seat may further comprise a lining which is configured to cover the rounded edge of the backrest element when the cabin attendant seat is in the rest position thereof. The lining may, for example, be in the form of a flap which is pivotal articulated to the frame, in particular the second frame element. The lining is preferably pretensioned by means of a suitable pretensioning device, for example, a spring, into a position in which it covers the rounded edge of the backrest element. However, the pretensioning device is preferably sized in such a manner that it does not impede the rotation of the backrest element about the rotation axis, that is to say, the lining is also carried in the event of rotation of the backrest element which the backrest element carries out in order to bring the cabin attendant seat into its operating position. In the event of a backward movement of the backrest element which the backrest element carries out in order to return the cabin attendant seat to its rest position, the pretensioning device pushes the lining back into its position in which it covers the rounded edge of the backrest element.

An aircraft monument arrangement comprises an aircraft monument and a cabin attendant seat which is described above and which is fastened to a side wall of the aircraft monument. The aircraft monument may be a galley, a toilet module, a partition wall or the like.

The aircraft monument arrangement preferably further comprises a storage compartment which is arranged adjacent to the cabin attendant seat. In particular, the storage compartment directly abuts the second frame element. Such an arrangement of the storage compartment is possible since the rotation axis is connected to the backrest element with spacing from the first side face of the backrest element in the region of a front side of the backrest element and there is therefore no requirement to leave a spacing from the backrest element that corresponds to the width of the first side wall in order to enable unimpeded rotation of the backrest element about the rotation axis.

A preferred embodiment of the invention will now be explained in greater detail with reference to the appended schematic drawings, in which:

FIG. 7 is an exploded view of the connection device according to FIG. 6, and FIGS. 8a and 8b are cross-sectional views of the backrest element and the frame, the cabin attendant seat being located in the rest position thereof in FIG. 8a and in the operating position thereof in FIG. 8b.

Figure 1:
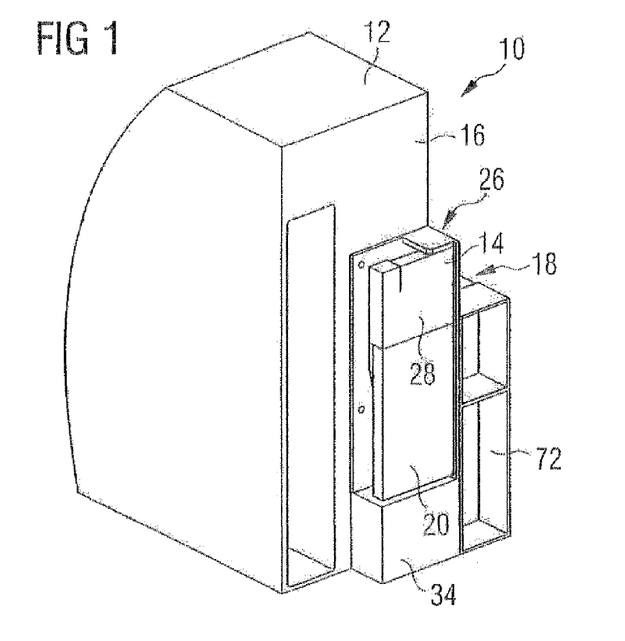
FIG. 1 is a three-dimensional illustration of an aircraft monument arrangement which comprises a rotatable cabin attendant seat, the rotatable cabin attendant seat being located in the rest position thereof.

FIG. 1 shows an aircraft monument arrangement 10 having an aircraft monument 12 which is constructed in the form of a galley. The aircraft monument arrangement 10 further comprises a cabin attendant seat 14 which is fastened to a side wall 16 of the aircraft monument 12. A fastening device is used to fasten the cabin attendant seat 14 to the aircraft monument side wall 16. The fastening device 18 is configured and sized in such a manner that it is capable of directing away a predetermined maximum force which can be introduced into the cabin attendant seat 14 during operation of the cabin attendant seat 14 via the side wall 16 of the aircraft monument 12. The predetermined maximum force in this instance is a force which acts on the cabin attendant seat 14 when the cabin attendant seat 14 is subjected to an acceleration of is 9G or 16G, respectively.

Figure 2:
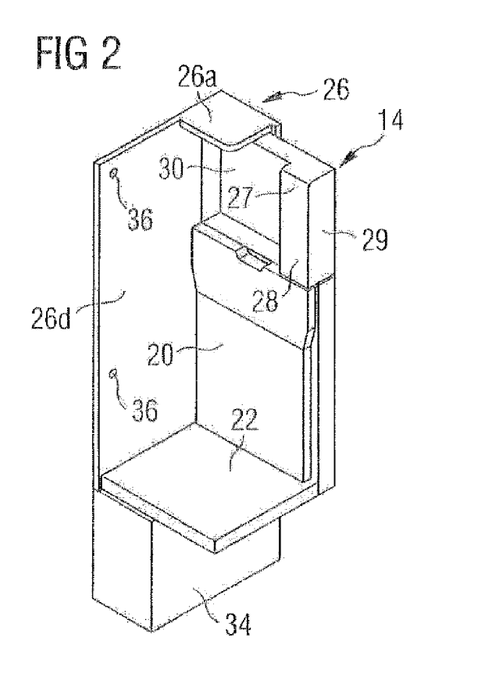
FIG. 2 is a three-dimensional illustration of a rotatable cabin attendant seat, the rotatable cabin attendant seat being located in the operating position thereof.

As can best be seen in FIG. 2, the cabin attendant seat 14 comprises a backrest element 20 and a seat element 22 which is fastened to the backrest element 20 and which is constructed as a folding seat element. In the folded-up state (see FIG. 1), the seat element 22 or a seat face of the seat element 22 abuts a front side of the backrest element 20. In the folded-down state thereof (see FIG. 2), however, the seat element 22, that is to say, a seat face of the seat element 22, extends substantially perpendicularly relative to the front side of the backrest element 20.

Figure 4:
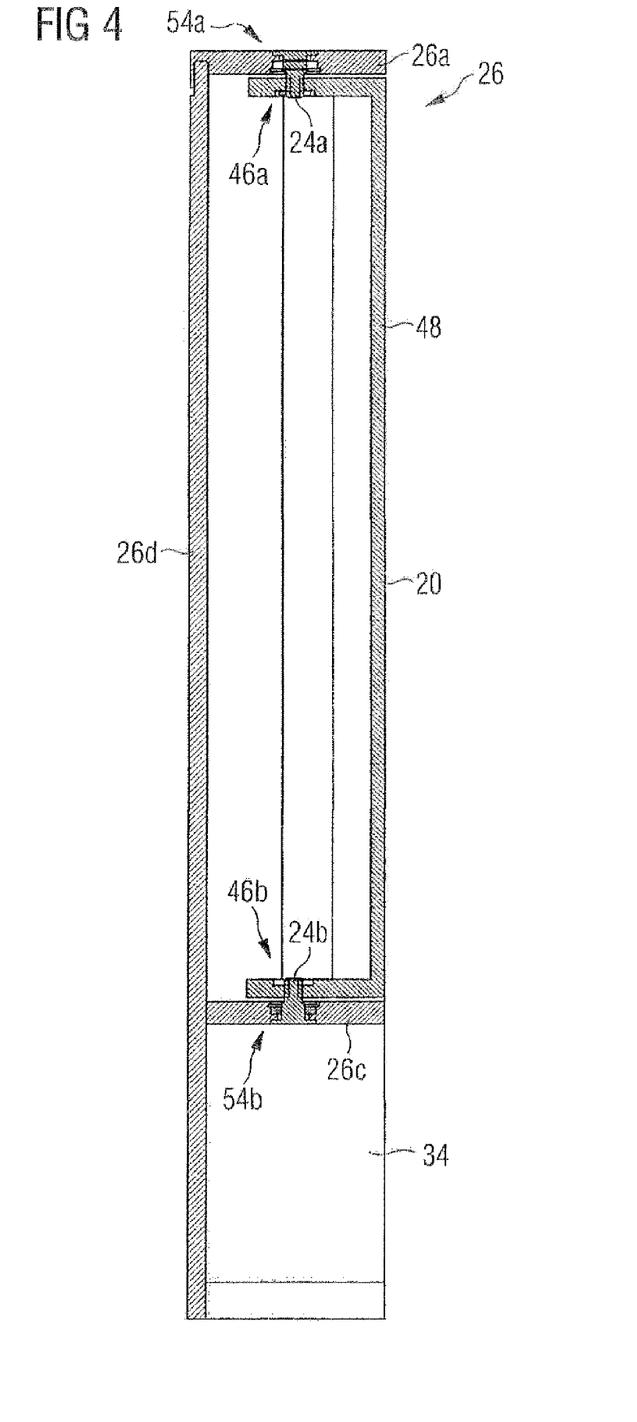
FIG. 4 is a detailed illustration of a frame of a fastening device for fastening the cabin attendant seat to a side wall of an aircraft monument.

The backrest element 20 is rotatable about a rotation axis 24a, 24b (see FIG. 4). By rotating the backrest element 20 about the rotation axis 24a, 24b, the cabin attendant seat 14 can be moved between a rest position shown in FIG. 1 and an operating position shown in FIG. 2. When the cabin attendant seat 14 is in its rest position, the front side of the backrest element 20 faces away from an inner space of an aircraft cabin in which the aircraft monument arrangement 10 is installed, that is to say, the front side of the backrest element 20 faces towards the side wall 16 of the aircraft monument 12. In order to move the cabin attendant seat 14 into its operating position, the backrest element 20 is rotated through approximately 90° about the rotation axis 24a, 24b relative to the aircraft monument 12. When the cabin attendant seat 14 is in the operating position thereof, the front side of the backrest element 20 extends substantially perpendicularly relative to the side wall of the aircraft monument 12 so that the seat element 22 can be folded down and a cabin attendant can sit on the cabin attendant seat 14.

The fastening device 18 for fastening the cabin attendant seat 14 to the side wall 16 of the aircraft monument 12 will be explained in greater detail below. The fastening device 18 comprises a frame 26 having a first, a second, a third and a fourth frame element 26a to 26d, see FIGS. 3 and 4. The first frame element 26a extends substantially parallel with an upper side of a headrest 28 of the cabin attendant seat 14. As illustrated in FIG. 2, there is provided in the headrest 28 a storage compartment 30 in which items of emergency equipment, but also other items required on-board the aircraft, can be accommodated. For example, the storage compartment 30 can be used to accommodate an on-board telephone. The storage compartment 30 is covered by a head cushion which is not illustrated in FIG. 2 for reasons of clarity. The head cushion may be able to be folded up or down in order to make the storage compartment 30 accessible. A handset of an on-board telephone integrated in the storage compartment 30 may be arranged in such a manner that it can be removed from a face 27 which extends substantially parallel with the front side of the backrest element 20 or from a side face 29 of the headrest 28. A positioning of the handset in the region of the side face 29 of the headrest 28 has the advantage that the on-board telephone can also be used when the cabin attendant seat 14 is in its rest position.

When the cabin attendant seat 14 is in its operating position, the second frame element 26b is orientated substantially parallel with a rear side of the backrest element 20. In the rest position of the cabin attendant seat 14, however, the second frame element 26b extends substantially parallel with a first side face 32 of the backrest element 20 and terminates substantially in alignment with the first side face 32 of the backrest element 20. The third frame element 26c extends substantially parallel with a lower side of the seat element 22 when the cabin attendant seat 14 is in the operating position thereof and the seat element 22 is folded down. The third frame element 26c is formed by a portion of an upper boundary wall of a storage compartment 34 which is arranged below the cabin attendant seat 14. A flap via which the storage compartment 34 is made accessible is located in the region of a face 35.

The storage compartment 34 is sized in such a manner that it terminates in alignment with a rear side of the backrest element 20 of the cabin attendant seat 14 when the cabin attendant seat 14 is located in the rest position thereof, see FIG. 1.

Figure 3:
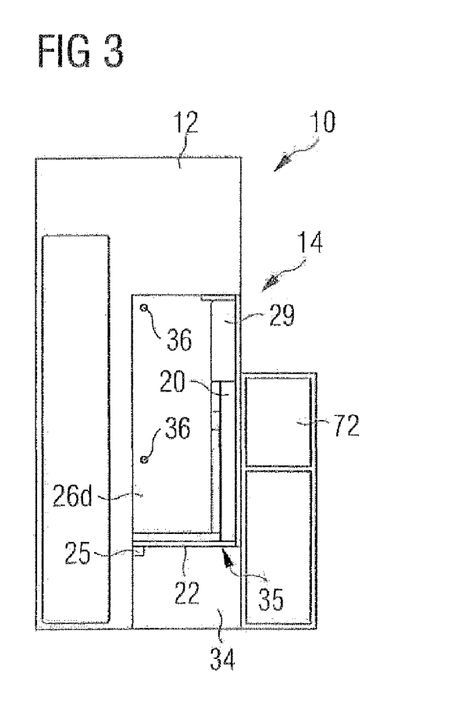
FIG. 3 is a front view of the aircraft monument arrangement, the rotatable cabin attendant seat being located in the operating position thereof.

A lock 25 schematically illustrated in FIG. 3 serves to lock the seat element 22 in its folded-down position with the storage compartment 34 when the cabin attendant seat 14 is located in the operating position thereof. Furthermore, the backrest element 20 and the seat element 22 can be secured before the cabin attendant seat 14 is folded in. In the event of a crash, the forces which can be produced by the folding-in action in the region of the axis of rotation 24a, 24b and in the region of the face 35 are transmitted to the frame 26, in particular the frame element 26d.

When the cabin attendant seat 14 is located in the operating position thereof, the fourth frame element 26d is orientated substantially parallel with the first side face 32 of the backrest element 20. When the cabin attendant seat 14 is located in the rest position thereof, the fourth frame element 26 extends substantially parallel with the front side of the backrest element 20. The fourth frame element 26d serves to secure the frame 26 to the side wall 16 of the aircraft monument 12. To this end, the fourth frame element 26d is provided with a plurality of bores 36. The bores 36 each serve to receive a fastening element, for example, a screw or a rivet, for fastening the frame to the side wall 16 of the aircraft monument 12.

Figure 5:
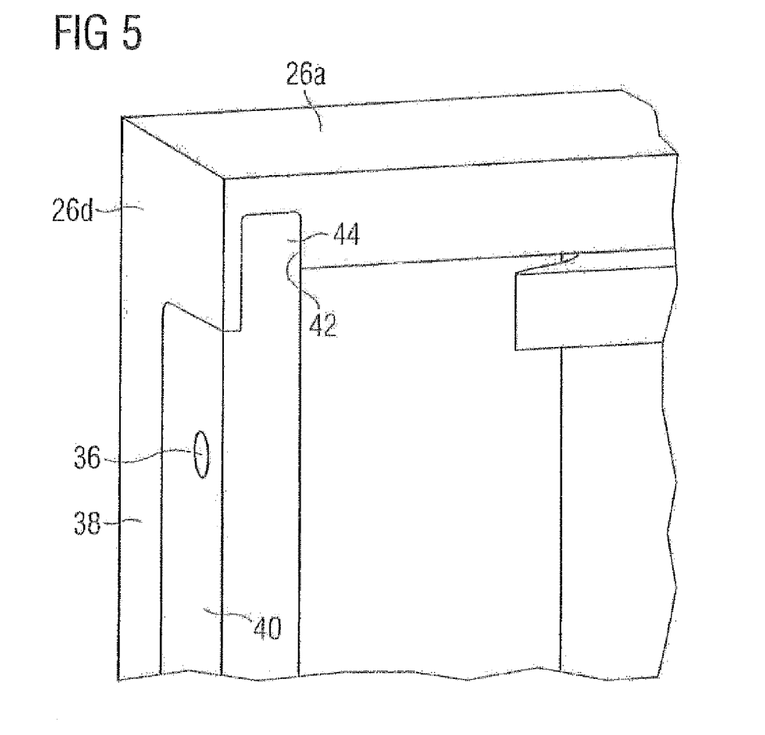
FIG. 5 is a detailed view of the connection of a first frame element and a fourth frame element of the frame according to FIG. 4.

As can be seen in FIG. 5, a first portion 38 of the fourth frame element 26d is constructed integrally with the first frame element 26a. However, a second portion 40 of the fourth frame element 26d is constructed as a separate component. In order to connect the second portion 40 of the frame element 26b that is not constructed integrally with the first frame element 26a, there is provided a groove 42 which is delimited by a surface of the first frame element 26a which faces the fourth frame element 26d and a part-region of the first portion 38 of the fourth frame element 26d that is constructed integrally with the frame element 26a. That is to say, a projection 44 which is formed on the second portion 40 of the fourth frame element 26d engages in the groove 42 and is retained in the groove 42 by a portion of the first frame element 26a which engages over the projection 44 and the second portion 40 of the fourth frame element 26d that is constructed integrally with the first frame element 26a. Such a configuration of the frame 26 enables optimised force transmission from the frame 26 to the side wall 16 of the aircraft monument 12.

Figure 6:
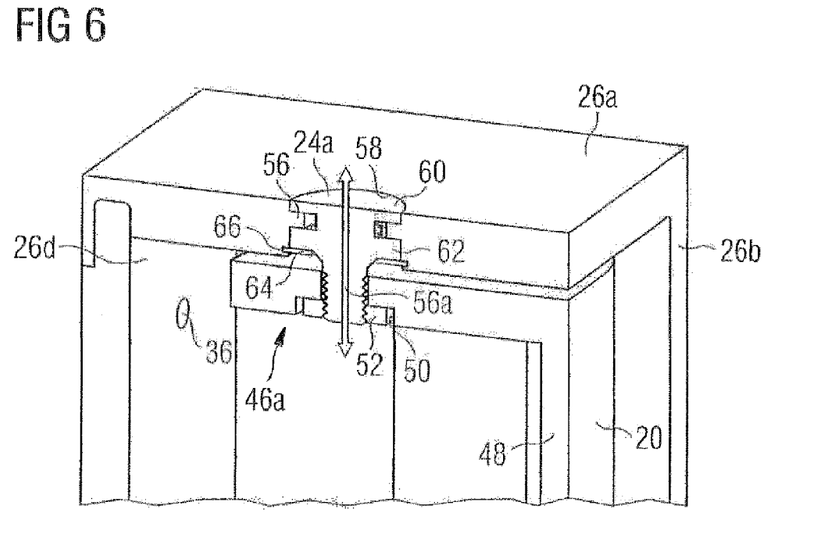
FIG. 6 is a detailed view of a connection device for rotatably connecting a rotation axis, about which a backrest element of the cabin attendant seat is rotatable, to the frame according to FIG. 4.
Figure 7:
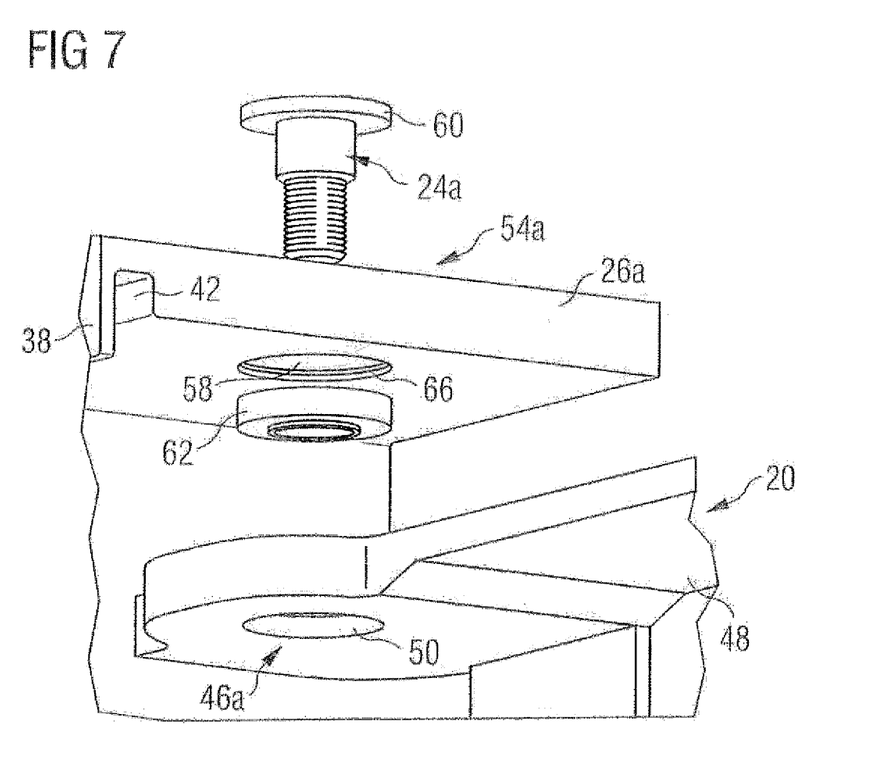

As can be seen from FIGS. 4, 6 and 7, the backrest element 20 of the cabin attendant seat 14 comprises two receiving devices 46a, 46b which are provided with an inner thread. The receiving device 46a serves to receive a first portion 24a of the rotation axis 24a, 24b whilst the receiving device 46b serves to receive a second portion 24b of the rotation axis 24a, 24b. The receiving devices 46a, 46b are each constructed in a frame 48 of the backrest element 20 and serve to be screwed to a portion of the rotation axis portions 24a, 24b that is provided with an outer thread. The receiving devices 46a, 46b further each have a recess 50. There is arranged in each recess 50 a counter-nut 52 which is screwed onto the portion of a rotation axis portion 24a, 24b that is provided with an outer thread in order to connect the rotation axis portion 24a, 24b to the backrest element 20 in a rotationally secure manner.

The fastening device 18 further comprises a first connection device 54a for rotatably connecting the rotation axis portion 24a to the frame 26, that is to say, the first frame element 26a, and a second connection device 54b for rotatably connecting the rotation axis portion 24b to the frame 26, that is to say, the third frame element 26c. Each connection device 54a, 54b comprises a bore 58 which is provided with a radial, inwardly protruding flange 56 for receiving a rotation axis portion 24a, 24b. A first surface of the flange 56 forms an abutment face for a head 60 of the rotation axis portions 24a, 24b which are each constructed in the form of a pin. However, a second surface of the flange 56 opposite the first surface forms an abutment face for a bearing 62 which is received in the bore 58. In the embodiment shown in the Figures, the bearing 62 is constructed as a self-aligning ball bearing and is retained in its position in the bore 58 by means of a resilient ring 64. The resilient ring 64 is supported in a groove 66 which is formed in a wall of the bore 58.

Owing to the configuration of the bearing 62 as a self-aligning ball bearing, it is ensured that complete destruction of the bearing 62 is prevented in the event of a crash. The bearing components are thereby prevented from becoming wedged and consequently from potentially blocking a rotation of the cabin attendant seat 14 into the rest position thereof. The construction of the bearing 62 as a self-aligning ball bearing consequently ensures that, even in the event of a crash, it is possible for the cabin attendant seat 14 to rotate into its rest position so that escape and emergency routes are not impeded by the cabin attendant seat 14.

Figure 8A:
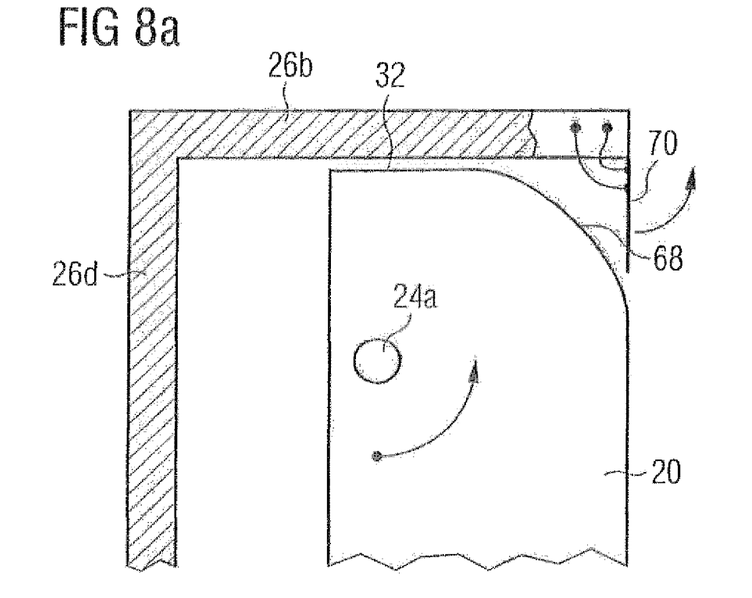
Figure 8B:
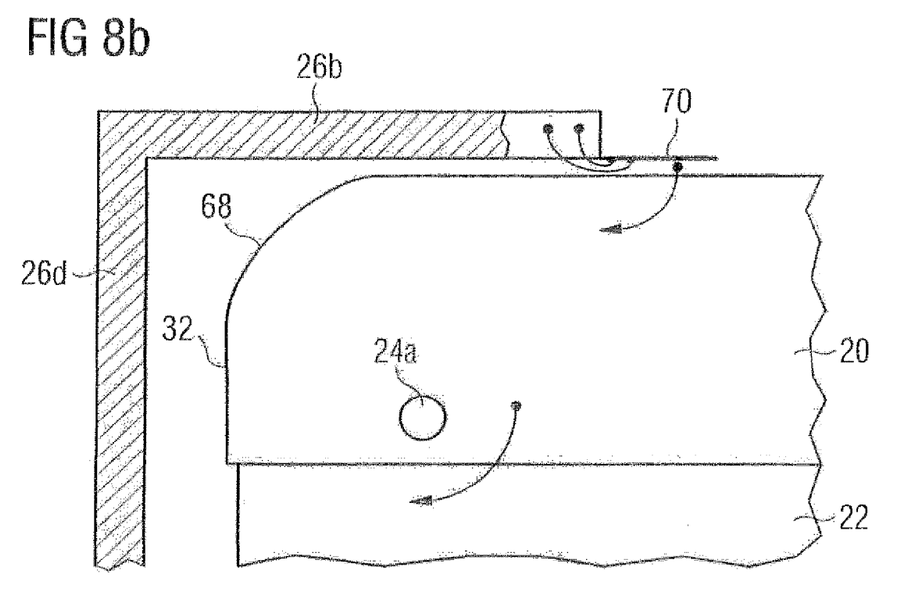

As becomes clear from FIG. 6, but particularly also from FIGS. 8a and 8b, the rotation axis portions 24a, 24b are each connected to the backrest element 20 with spacing from the first side face 32 of the backrest element 20 in the region of the front side of the backrest element 20. No spacing thereby has to be maintained in the rest position of the cabin attendant seat 14 between the first side face 32 of the backrest element 20 and the second portion 26b of the frame element 26 in order to enable unimpeded rotation of the backrest element 20 about the rotation axis 24a, 24b. Consequently, a particularly installation-space-saving arrangement of the cabin attendant seat 14 within the aircraft arrangement 10 is possible. However, in order to prevent the backrest element 20 from colliding with the frame 26, in particular the second frame element 26b, during its rotation about the rotation axis 24a, 24b, an edge 68 formed by the first lateral face 32 and the rear side of the backrest element 20 is constructed in a rounded manner.

In order to prevent impairment of the visual impression of the cabin attendant seat 14 owing to this rounded edge 68, there is provided a lining 70 which extends along the second frame element 26b and which covers the rounded edge 68 when the cabin attendant seat 14 is located in the rest position thereof. The lining 70 is constructed in the form of a pivotable flap and is pretensioned by means of a pretensioning device which is constructed, for example, in the form of a spring, into the position thereof which is illustrated in FIG. 8a and in which it covers the rounded edge 68. However, when the backrest element 20 is rotated about the rotation axis 24a, 24b, the lining 70 is also carried, that is to say, the pretensioning force of the pretensioning device is selected in such a manner that it does not prevent the rotation of the backrest element 20 about the rotation axis 24a, 24b.

The arrangement of the rotation axis 24a, 24b with spacing from the first side face 32 of the backrest element 20 enables a free space in a region of the aircraft monument side wall 16 adjacent to the cabin attendant seat 14 to be dispensed with. Instead, as illustrated in FIGS. 1 and 3, a storage compartment 72 may be arranged directly adjacent to the second frame element 26b. The storage compartment 72 can be used to receive items of emergency equipment, but also other objects. Finally, the cabin attendant seat 14 is provided with a safety belt.

The invention claimed is:

1. A cabin attendant seat comprising:
   a backrest element,
   a seat element which is fastened to the backrest element,
   the backrest element being rotatable about a rotation axis in order to move the cabin attendant seat between a rest position and an operating position, and a fastening device for fastening the cabin attendant seat to a side wall of an aircraft monument, the fastening device being constructed and sized in such a manner that it is capable of directing away a predetermined maximum force which can be introduced into the cabin attendant seat during operation of the cabin attendant seat via the side wall of the aircraft monument, wherein:

the fastening device comprises a frame having a first, a second, a third and a fourth frame element, when the cabin attendant seat is in the operating position, the first frame element is mounted substantially perpendicular to and above an upper portion of the fourth frame element and orientated substantially parallel with and located above an upper side of a headrest of the cabin attendant seat, the second frame element is orientated substantially parallel with a rear side of the backrest element of the cabin attendant seat, the third frame element is orientated substantially parallel with a lower side of the seat element of the cabin attendant seat and the fourth frame element is orientated substantially parallel with a first side face of the backrest element of the cabin attendant seat, and when the cabin attendant seat is in the rest position, the second frame element is oriented substantially parallel to a second side face of the backrest element of the cabin attendant seat, and the fourth frame element is oriented substantially parallel to the rear side of the backrest element of the cabin attendant seat.

2. The cabin attendant seat according to claim 1, wherein the third frame element is formed by a portion of an upper boundary wall of a storage compartment which is arranged below the cabin attendant seat when the cabin attendant seat is mounted in an aircraft cabin.

3. The cabin attendant seat according to claim 1, wherein a first portion of the fourth frame element is constructed integrally with the first frame element and in that a second portion of the fourth frame element that is not constructed integrally with the first frame element is received in a groove which is delimited by a surface of the first frame element facing the fourth frame element and a part-region of the first portion of the fourth frame element that is constructed integrally with the first frame element.

4. The cabin attendant seat according to claim 1, wherein at least one bore for receiving a fastening element for fastening the frame to the side wall of the aircraft monument is constructed in the fourth frame element.

5. The cabin attendant seat according to claim 1, wherein the backrest element comprises a receiving device which is provided with an inner thread, and in that a portion of the rotation axis that is provided with an outer thread is screwed in the receiving device in order to connect the rotation axis to the backrest element.

6. The cabin attendant seat according to claim 1, wherein the fastening device comprises a first connection device for rotatably connecting the rotation axis to the frame, in particular the first frame element and/or a second connection device for rotatably connecting the rotation axis to the frame, in particular the third frame element.

7. The cabin attendant seat according to claim 6, wherein the first and/or the second connection device comprise(s) a bore which is provided with a radially inwardly protruding flange for receiving the rotation axis.

8. The cabin attendant seat according to claim 7, wherein a first surface of the flange forms an abutment face for a head of a rotation axis that is constructed in the form of a pin and/or in that a second surface of the flange opposite the first surface forms an abutment face for a bearing which is at least partially received in the bore.

9. The cabin attendant seat according to claim 8, wherein the bearing is retained in its position in the bore by means of a resilient ring, the resilient ring being supported in particular in a groove which is formed in a wall of the bore.

10. The cabin attendant seat according to claim 1, wherein the rotation axis is connected to the backrest element with spacing from the first side face (32) of the backrest element (20) in the region of a front side of the backrest element (20).

11. The cabin attendant seat according to claim 1, wherein an edge formed by the first side face and a rear side of the backrest element is constructed in a rounded manner.

12. The cabin attendant seat according to claim 11, further comprising a lining which is configured to cover the rounded edge of the backrest element when the cabin attendant seat is located in its rest position.

13. An aircraft monument arrangement comprising:
an aircraft monument and
a cabin attendant seat which is fastened to a side wall of the aircraft monument according to claim 1.

14. The aircraft monument arrangement according to claim 13, characterised by a storage compartment which adjoins the cabin attendant seat adjacent to the second frame element.

* * * * *